United States Patent [19]
Geisthoff

[11] 4,107,952
[45] Aug. 22, 1978

[54] PROTECTIVE GUARD ASSEMBLY FOR A UNIVERSAL JOINT

[75] Inventor: Hubert Geisthoff, Lohmar, Fed. Rep. of Germany

[73] Assignee: Jean Walterscheid GmbH, Lohmar, Fed. Rep. of Germany

[21] Appl. No.: 774,468

[22] Filed: Mar. 4, 1977

[30] Foreign Application Priority Data

Mar. 5, 1976 [DE] Fed. Rep. of Germany ....... 2609069

[51] Int. Cl.² .............................................. F16D 3/84
[52] U.S. Cl. .................................................. 64/32 F
[58] Field of Search .................. 64/32 F, 32 R; 74/18

[56] References Cited
U.S. PATENT DOCUMENTS

| | | | |
|---|---|---|---|
| 2,255,172 | 9/1941 | Johnson | 64/32 F X |
| 2,331,982 | 10/1943 | Johnson | 64/32 F X |
| 2,575,602 | 11/1951 | Stillwagon | 64/32 F X |

*Primary Examiner*—Edgar W. Geoghegan
*Attorney, Agent, or Firm*—Edmund M. Jaskiewicz

[57] ABSTRACT

A universal joint between the ends of two shafts is enclosed by a protective guard assembly comprising rotatably mounted boots of a resilient elastic material extending over the joint from the ends of the shafts. An annular member overlaps a portion of each of the boots and has a supporting ring which extends radially between the ends of the boots. The guard member may be positioned on the inner or outer surfaces of the boots and the support ring respectively extends radially outwardly or radially inwardly between the boot ends.

3 Claims, 3 Drawing Figures

PROTECTIVE GUARD ASSEMBLY FOR A UNIVERSAL JOINT

The present invention relates to a protective guard assembly for a universal joint between the ends of two shafts, more particularly, to an improvement in the guard assembly which comprises funnel-shaped boots extending from the shaft ends over the universal joint.

Cardanshafts such as used in agricultural machinery are provided with various forms of protective devices to enclose the universal joints employed in such shafts. One such protective guard assembly is disclosed in the "German Gebrauchsmuster" 1,816,543 and comprises a pair of funnel-shaped boots of resilient elastic material rotatably mounted at the opposite ends of the yokes of the joint and extending over the joint to enclose the joint. Such a protective gaurd only provides full cover for the universal joint through a bending angle of approximately 30°. Further bending of the joint as commonly occurs in operation will cause destruction of the boots since at the greater angles the boots must be forceable pressed against each other in order to maintain mutual engagement.

Another form of a known protective guard assembly is shown in the German Pat. No. 1,750,129 and comprises three mutually overlapping spherical segments which are positioned over the universal joint. This guard assembly permits a maximum bending angle of the joint of approximately 60°. However, this protective guard assembly is not satisfactory since in agricultural operation universal joints are frequently bent through angles as much as 90° during cornering or shunting maneuvers. When the joints having such guard assemblies are bent at angles greater than 60° the guard assemly is subjected to damage and destruction.

It is therefore the principal object of the present invention to provide a novel and improved protective guard assembly for a universal joint between the ends of two shafts.

It is another object of the present invention to provide such a guard assembly which is capable of completely enclosing and protecting the universal joint through full operating angles of the joint and which will permit bending of the joint to angles up to about 90° without subjecting the guard asembly to any damage.

According to one aspect of the present invention a protective guard assembly for a universal joint between the ends of two shafts may comprise rotatably mounted boots of a resilient elastic material extending over the joint from the ends of the shafts. An annular guard member overlaps a portion of each of the boots and has a supporting ring radially positioned around the center of the universal joint. The supporting ring extends between the boots to support the end thereof.

As result of this invention, the universal joint will remain fully covered by the protective guard assembly for all normal operating angles of the universal joint. When the joint is bent up to about 90°, a pivoting or hinge-like action will be obtained within the elastic deformation range of the boots in coaction with the annular guard member and the supporting ring without any damage to the guard assembly.

Other objects and advantages of the present invention will be apparent from the acompanying description when taken in conjunction with the following drawings, which are exemplary, wherein.

Proceeding next to the drawings wherein like reference symbols indicate the same parts throughout the various views a specific embodiment and modifications of the present invention will be described in detail.

Figure 1:
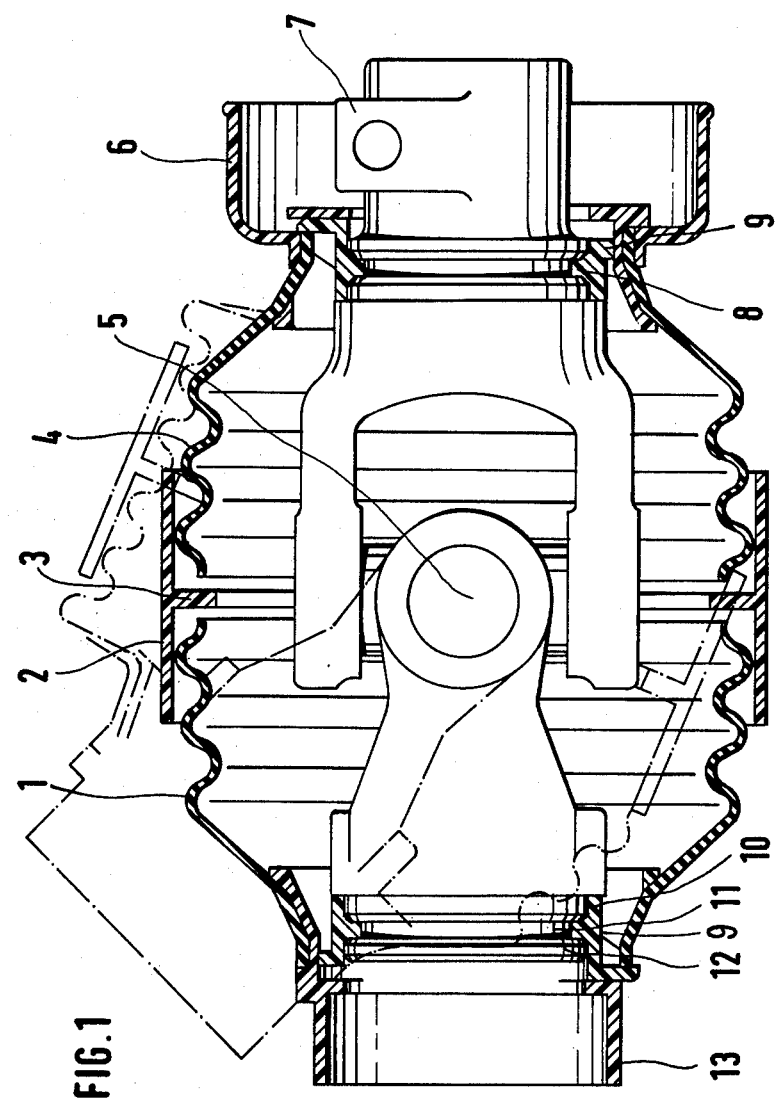
FIG. 1 is an elevational view of a univeral joint provided with the guard assembly of the present invention being shown in longitudinal section.

As may be seen in FIG. 1, the protective guard assembly comprises funnel-shaped protective boots 1 and 4 each provided with a plurality of annular corrugations in the form of a bellows and constructed of resilient elastic material such as synthetic plastic as known in the art. The boot 1 is rotatably mounted by a connecter ring 9 in an annular groove 11 formed in the shaft portion 12 of the yoke of the universal joint on the tubular element side of the joint and is connected with an outer covered tubular portion 13 which extends over the tubular shaft portion of the cardan or universal joint shaft. The boot 4 is smiliarly mounted by a connector ring 9 to an annular groove 11 formed in the connection 7 of the yoke which is connected to a power-takeoff shaft and connected to a resilient skirt or cup-shaped member 6. Both yoke shafts 7 and 12 are thus free to rotate with respect to the protective guard assembly.

An annular guard member 2 which is substantially cylindrical in shape and made of a suitable plastic material is positioned radially outwardly of the center 5 of the universal joint and overlaps the outer end portions of the boots 1 and 4. Extending radially inwardly from the central portion of the inner wall of the guard member 2 is a protective or supporting ring 3 which extends radially between the ends of the boots 1 and 4.

As illustrated in FIG. 1, the annular guard member 2 is positioned around the outer peripheral surfaces of the boots and the supporting ring 3 extends radially inwardly therefrom. The supporting ring 3 thus performs the dual functions of preventing slipping of the annular guard member from its illustrated position and of being gripped between the ends of the resilient boots 1 and 4 so as to act as a guiding or steering structure.

In operation, the cardan shaft of the agricultural or other machine rotates with respect to the guard assembly which is maintained stationary by suitable restraining structure as knwon in the art. When a deflection or bending of the universal joint occurs, the regions of the boots 1 and 4 next to the pivot point of the angle of the joint, at the inside of the bend, will be compressed in such a manner that the outer walls of the boots because of their bellows construction will move closer together to engage the annular member 2. The annular member 2 thus functions as a guiding and steering structure because the corrugations of the boots 1 and 4 are engaged and guided by the inner wall surface of the annular member 2. In the regions of the boots 1 and 4 which are away from the bend of the joint angle the concertina boots will slide along the inner wall surface of the guard member 2 and the respective corrugations will be expanded. Should the bending angle of the joint change, the corrugations of the boots 1 and 4 will be correspondingly pushed together and extended in accordance with the new positions assumed by the boots resulting from the new bending angle.

In the region of the bent universal joint which may occur when the cardanshaft is rotating, the boots 1 and 4 and the annular guard member 2 with its supporting ring 3 are so shaped and positioned to completely enclose and cover the rotating universal joint under maximum potential bending of the joint so as to provide complete safey protection from accident. When the cardanshaft is not rotating, the universal joint may deflect during cornering or other maneuvering operations to as much as 90° but the protective guard assembly will incur no damage since the resilient corrugated boots can be stretched and compressed within their elastic deformability range without any permanent deformation after the shaft returns to the normal operating range of angles. As result of these characteristics, the cardanshaft guard assembly provides comprehensive accident protection for rotating cardanshafts and at the same time enables agricultural machines employing such cardanshafts to bend at angles up to 90° without any adverse or harmful consequences to the guard assembly.

The boots 1 and 4 may also be assembled to their respective positions under a pre-applied stress. The guard may then perform a supporting or retaining funcion with respect to the universal joint. On the other hand, if such functions or the application of force are not desired during bending of the universal joint, the annular member 2 can be assembled with appropriate clearance on the boots. The connections 12 and 7 are not affected in any way by the construction of the guard assembly according to the present invention.

Figure 2A:
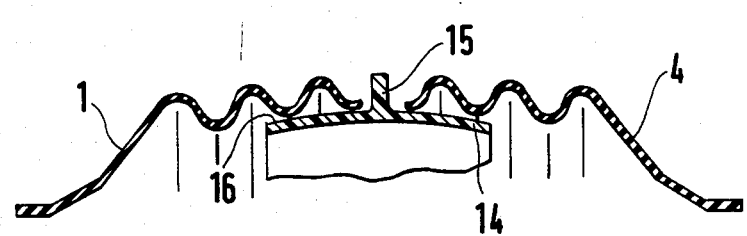
FIG. 2a is a view of a portion of the quard assembly of FIG. 1 and showing a modification of the annular guard member.

In FIG. 2a, there is shown an annular guard member 14 which is positioned on the inner peripheral surfaces of the end portions of the boots 1 and 4 and is provided at its central portion with a supporting ring 15 which extends radially outwardly between the ends of the boots. The outer surface 16 of the annular guard member 14 is arcuate in the axial direction of the guard member to facilitate sliding of the boots in accordance with deflections of the universal joint.

Figure 2B:
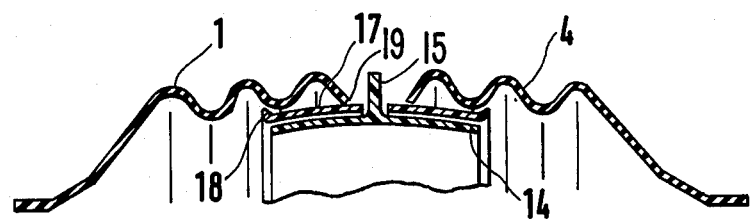
FIG. 2b is a view similar to that of FIG. 2a and showing a further modification thereof.

In FIG. 2b additional sliding rings 17 are mounted on the outer surface of the annular guard member 14 on both sides of the ring 15. Each sliding ring 17 is provided with an annular groove 18 adjacent its outer end to receive the end portion 19 or a corrugation of the respective one of the boots 1 and 4. When the grooves 18 are engaged with boot ends 19 or corrugations, during a bending of the universal joint the outer portions of the boots with respect to the bend will be elongated and the inner portions compressed. The guard assembly will thus remain closed for larger bending angles. This construction will provide maximum covering of the universal joint beyond normal operating angles. Additional bending of the angle up to about 90° is thus possible by the hinge-like properties of the guard assembly in the elastic deformation range.

Thus it can be seen that the present invention has disclosed an improved protective guard assembly for universal joints employed in cardan shafts, particularly in agricultural machinery, wherein the guard will provide complete coverage and protection through bending angles of the joint up to about 90°.

It will be understood that this invention is susceptible to modification in order to adapt it to different usages and conditions, and accordingly, it is desired to comprehend such modifications within this invention as may fall within the scope of the appended claims.

What is claimed is:

1. In a protective guard assembly for a universal joint between the ends of two shafts, rotatably mounted boots of a resilient elastic material extending over said joint from the shaft ends, an annular guard member disposed around the outer surfaces of said boots and overlapping a portion of each of said boots, said annular guard member having a supporting ring radially positioned around the center of the universal joint and extending radially inwardly between said boots to support the ends thereof.

2. In a protective guard assembly for a universal joint between the ends of two shafts, rotatably mounted boots of a resilient elastic material extending over said joint from the shaft ends, an annular guard member disposed at the inner surfaces of said boots and overlapping a portion of each of said boots, said annular guard member having a supporting ring thereon extending radially outwardly therefrom between said boots to support the ends thereof, the outer surface of said guard member has an arcuate axial configuration.

3. In a protective guard assembly as claimed in claim 2 and a sliding ring on the outer surface of said guard member, said ring having a groove to receive an end of the boot.

* * * * *